Figure 1:
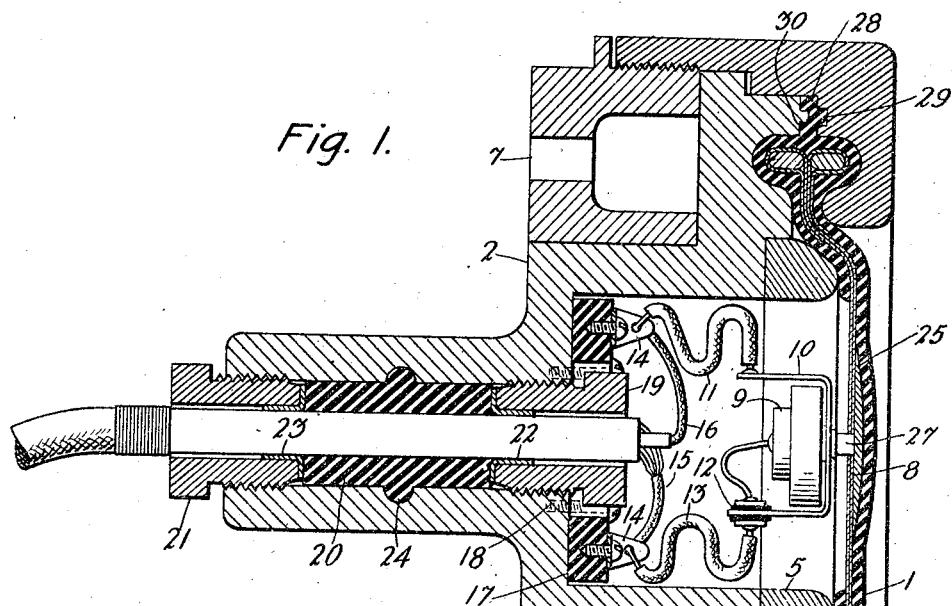

June 26, 1923.

C. R. MOORE

VIBRATION DETECTOR

Filed June 24, 1919

1,460,032

Inventor:
Charles R. Moore
by J. E. Roberts
Att'y.

Patented June 26, 1923.

1,460,032

UNITED STATES PATENT OFFICE.

CHARLES R. MOORE, OF WYOMING, NEW JERSEY, ASSIGNOR TO WESTERN ELECTRIC COMPANY, INCORPORATED, OF NEW YORK, N. Y., A CORPORATION OF NEW YORK.

VIBRATION DETECTOR.

Application filed June 24, 1919. Serial No. 306,495.

*To all whom it may concern:*

Be it known that I, CHARLES R. MOORE, a citizen of the United States, residing at Wyoming, in the county of Essex, State of New Jersey, have invented certain new and useful Improvements in Vibration Detectors, of which the following is a full, clear, concise, and exact description.

This invention relates to vibration detectors and more particularly to a detector of this character which, while it may be used for a variety of purposes, is especially designed for the detection of vibrations propagated through the water such as are produced by marine and submarine vessels.

It is desirable that devices of this character, especially when employed in the detection of the presence of submarine vessels, respond with accuracy to very feeble vibratory effects without becoming unduly resonant in response to any vibrations within the useful range of frequencies.

Since the detecting device is often immersed to varying depths of water, it may be subjected to varying pressures which become comparatively large in some instances. Therefore, it is important that the normal sensitiveness of the device be maintained and independently of its depth of immersion. It is also necessary to provide means for sealing the casing containing the device to effectively prevent the entrance of moisture under comparatively great pressures.

It is the object of the present invention to provide an improved device of this character capable of being immersed to a comparatively great depth in the water without materially impairing the normal sensitivity of the detector to vibrations of all useful frequencies or the effectiveness of the sealing of the casing enclosing the detector.

In order to attain this object, in accordance with one feature of the invention, a current-varying device of the inertia type is supported from a self-sustaining composite diaphragm composed of a fabric embedded in and integrally united with soft energy absorbing material, such diaphragm being stretched so that the elastic limit of the fabric is closely approached. More specifically, the current-varying means, which may be an ordinary microphone button, is supported by a diaphragm composed of canvas or similar fabric embedded in and united with soft rubber or similar material having the property of inherent damping, adjustable means being provided for radially stretching such diaphragm when placed in position in the detector until the elastic limit of the fabric is approximated. Although the natural frequency of the composite diaphragm when thus stretched is within the useful range of frequencies, the high internal friction thereof effectually damps the movement thereof and practically eliminates overtones.

In accordance with another feature of the invention, means is provided for imparting a piston-like movement to the central portion of the diaphragm. More specifically, an inflexible plate member introduced into the center of the diaphragm between the canvas or other fabric and the rubber for supporting the microphone button is so proportioned and designed that the movement of an appreciable portion of the diaphragm in response to the received vibrations approximates that of a reciprocating piston instead of the movement of an ordinary flexible diaphragm. This method of support also insures that the button vibrates in the direction of its axis independently of the position of the detector.

In accordance with an additional feature of the invention, means is provided for maintaining the effective initial radial tension of the diaphragm fabric independently of increased pressures exerted against the diaphragm. To accomplish this result, the rubber or other material, although omitted from the central portion of the interior surface of the diaphragm, is provided between the diaphragm and a stretching member bearing against the interior surface of the diaphragm. The elastic material introduced at this point serves to compensate for varying external pressures exerted on the diaphragm when the device is submerged, so that a minimum variation in the tension of the fabric is caused thereby.

In accordance with another feature of the invention, metallic rings embedded within the diaphragm cooperate with the metallic casing in the assembly of the device to completely imprison the energy absorbing material composing the periphery of the diaphragm, thereby preventing the entrance of water under great pressures. In connection with this feature, the rubber or other material is so constricted at various intermediate points around the periphery that its movement past these points is prevented so that a water-seal under very high initial pressures may be produced and maintained.

In accordance with another feature of the invention, means is provided for sealing the leading-in conductors within the entranceway provided therefor in the casing, the effectiveness of such means being unimpaired by the external pressures encountered in the use of the device or by strains which may be introduced in the conductors themselves. More specifically, a tube of comparatively soft rubber or similar material closely surrounding the conductors is imprisoned between the surrounding casing-wall by means of opposing adjustable metallic bushing members, an intermediate angular recess being provided in the casing-wall for the reception of the rubber when the bushings are in their final positions, thereby placing the conductors at such point under an increased pressure.

Figure 2:
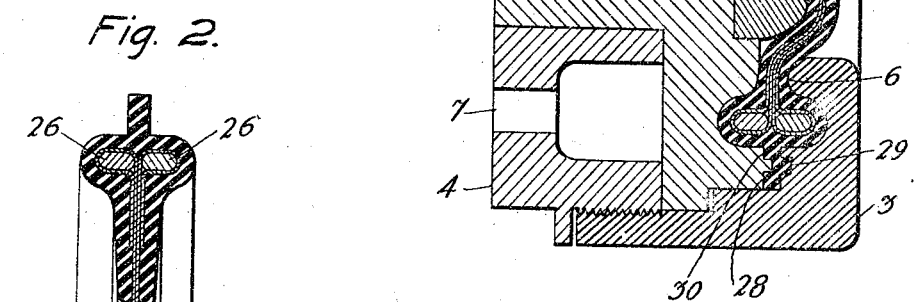
Figure 3:
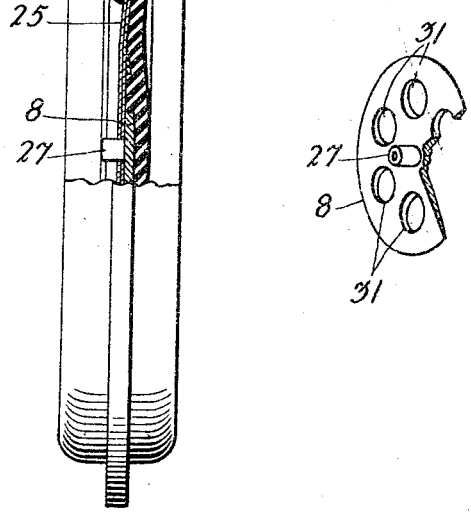

The above mentioned and other features of the invention, not specifically mentioned, will clearly appear from the following specification and the annexed drawing, in which Fig. 1 shows a sectional view of a device embodying the invention; Fig. 2 shows a view partially in section of the associated diaphragm; and Fig. 3 shows a perspective also partially in section of the plate-member embedded in the diaphragm for supporting the current-varying device.

In the embodiment illustrated in the drawing, a complete detector is shown which may be immersed to comparatively great depths in water and which may be used for the detection of the submarine or other marine vessels located at a distant point and producing characteristic vibrations.

A composite diaphragm 1 is clamped in position over an opening in the casing 2, by the threaded cooperation of an annular face member 3 and an annular adjustable member 4. An annular stretching member 5 surrounding the opening in the casing presents a rounded bearing surface for the interior surface of the diaphragm and cooperates with the rounded portion 6 of the face member 3 to stretch the diaphragm 1 when the face member is drawn toward the rear of the device by a proper rotation of member 4 through the medium of a spanner wrench inserted in the openings 7—7 or in any suitable manner. The annular member 5, in cooperation with the rubber cushion on the inside of the composite diaphragm 1, operates as a compensator to keep the tension of the composite diaphragm substantially constant during variations in hydrostatic pressure.

A metallic plate member 8 embedded within the diaphragm serves to suitably support the current-varying device 9, which may be of any well-known inertia type, in which a cylindrical chamber encloses an electrode secured to the member 8 and another electrode mounted in the chamber by means of a flexible diaphragm, a mass of granular carbon or other resistance varying material being introduced between the opposing faces of the electrodes. One end of a substantially U-shaped member 10 attached to and electrically connected with the front electrode of the current-varying device serves to provide a terminal to which the conductor 11 may be soldered or otherwise suitably electrically connected. The other end of member 10 serves to support an insulating bushing 12 through which the conductor 13 passes for electrical connection with the rear electrode. The conductors 11 and 13 are also electrically connected with the leading-in conductors 15 and 16 respectively, through the medium of suitable connectors 14—14, mounted by means of screws, or in any other suitable manner, upon an insulating base 17 secured to the casing by means of screws 18—18. This arrangement of wiring serves to render the current-varying device unaffected by incidental strains to which the leading-in conductors may be subjected. The cable containing the leading-in conductors passes through an exterior metallic bushing 21 in threaded engagement with the casing 2, an intermediate bushing 20 of soft rubber or other similar material, and an interior metallic bushing 19 also in threaded engagement with the casing 2. It will be evident that the advance of the opposing bushings 19 and 21 will longitudinally compress the rubber bushing 20 between the facing members 22 and 23 and cause the material thereof to enter the annular recess 24 in the surrounding wall of the casing. Due to the high state of compression existing throughout the member 20 when the bushings 19 and 21 occupy their final positions, the material included in the annular recess 24 serves to materially increase the pressure exerted upon the entering cable at an intermediate point, such portion being, in effect, a highly stretched rubber ring bearing upon the bushing at the intermediate point. Movement of the cable is resisted thereby and any movement of such cable which may occur does not impair the effectiveness of the seal.

The composite self-sustaining diaphragm formed by molding, or in some other suitable manner, comprises two layers 25—25 of canvas or other suitable material, the periphery of each layer being wrapped around a ring 26. The two layers assembled on their respective rings are then placed in face-to-face engagement, the stud 27 of the plate member 8 inserted through a central perforation provided in each layer, and the resultant structure impregnated by and coated with soft rubber or other energy absorbing inherently damping material by molding or some other suitable process. Due to the apertures 31 provided in the member 8, which becomes substantially filled with rubber during the molding process, such member is integrally united with the fabric and the rubber coating.

When the diaphragm 1 and the face member 3 are placed in position in front of the casing 2, and the member 4 advanced upon the threaded portion of the casing, the diaphragm is forced to assume the position shown in Fig. 1, whereby the fabric is stretched to approximately its elastic limit and a soft rubber rim-portion substantially fills the opposing offset spaces 28, 29 and 30 provided between the face member 3 and the opposing casing wall. It will be noted that the rounded surface of portion 6 of the face member 3 so closely approaches the opposing surface of the casing wall that the rubber portion of the diaphragm, radially exterior to these surfaces, is effectually imprisoned due to a reduced cross-section of such material at this point. Not only is the material of the rim-portion of the diaphragm imprisoned between the metal rings 26—26 and the cooperating surfaces of the face member 3 and the casing 2 but also its resultant reduced thickness in the passages connecting the spaces 28, 29 and 30 prevents its cold flow from one space to another under pressure and insures the complete filling of the spaces. In this manner a water-tight seal is provided, which it has been found by experiment, will withstand the comparatively large pressures encountered when the device is submerged to relatively great depths.

The rubber interposed between the rear fabric layer and the rounded member 5 serves as a cushioning device which absorbs the increased pressures encountered as the device is submerged so that the tension of the fabric is not materially increased. When the diaphragm is stretched to approximately its elastic limit, the direction of the force is such that the component tending to compress the rubber cushion is slight. However, upon the device being subjected to pressure, the forces acting are normal to the diaphragm and to the rubber cushion, thus further compressing the cushion and producing a slight sag in the diaphragm which offsets the effect of the increased pressure. This arrangement makes it possible to employ a diaphragm which is under the greatest permissible degree of tension, thereby operating at its best efficiency at all depths of immersion without impairing its strength and without requiring any adjustment to meet the requirements of the varying depths.

It is also evident that the flexible diaphragm 1, moving in response to received vibrations, imparts to the inflexible member 8, integrally united with the diaphragm and supporting the current-carrying device 9, a motion approximating that of a reciprocating piston, thereby improving the efficiency of the translation of such vibrations into current variations.

In accordance with the usual practice followed in employing devices of this nature, the leading-in conductors 15 and 16 may be suitably connected with an electrical circuit including a telephone receiver or other suitable means for transforming the current variations produced by the device 9 into audible effects for observation purposes.

The gradual reduction in thickness of the member 8 toward the periphery, not only provides a member having a plurality of frequencies of vibration, thereby approximating a plurality of concentric rings having differing frequencies, but also provides a means for gradually increasing the inertia of the composite diaphragm from the periphery of the member toward the center thereof. It has been found by experiment that the latter feature compensates for the reduced amplitude of vibration which would be caused by rendering a portion of the diaphragm inflexible so that the amplitude is not materially affected.

What is claimed is:

1. In a vibration detector for use under varying pressures, a stretched diaphragm, a current-varying device supported by said diaphragm, and means for rendering the degree of stretching of said diaphragm substantially independent of variations in pressure.

2. In a vibration detector for under-water use, a casing, a composite diaphragm having a peripheral portion of soft waterproof material, a current-varying device supported by the diaphragm, means for securing the diaphragm to the casing, and means cooperating therewith to imprison such peripheral portion, thereby rendering the junction waterproof.

3. In a vibration detector for under-water use, a casing, a composite diaphragm having a facing of soft energy-absorbing material, a rigid member near the periphery of the diaphragm and integrally united therewith, a current-varying device supported by the diaphragm, and means for attaching the diaphragm to the casing, said means reducing the thickness of the facing within the rigid member, thereby imprisoning the exterior portion of the energy-absorbing material to render the junction waterproof.

4. In an electrical device for under-water use, an electrical conductor, a casing having an aperture therein for the entrance of the conductor, a bushing member within the aperture and surrounding the conductor, and means for increasing the thickness of the wall of the bushing member at an intermediate point thereof in response to the application thereto of longitudinal pressures thereby rendering the aperture waterproof and resisting the movement of the conductor.

5. In an electrical device for under-water use, an electrical conductor, a casing having an aperture in the wall thereof for the entrance of the conductor, a soft bushing member surrounding the conductor within such aperture, means for applying longitudinal pressures to the bushing member for rendering the aperture waterproof, and means responsive thereto for abnormally increasing the radial forces exerted by the bushing member at an intermediate point thereof to resist the movement of the conductor.

6. In a vibration detector for use under varying pressures, a casing, a sound-responsive body mounted on said casing under tension approaching its elastic limit, and means to prevent the increase of such tension to the elastic limit of the material in response to an increase in pressure.

7. In an electrical device for use under humid conditions, a casing having an aperture therein, a soft rubber member for closing such aperture, and means for imprisoning the peripheral portion of such member in the form of a plurality of concentric rings joined by reduced thickness of material, thereby effectually preventing the ingress of moisture.

8. In a vibration detector, a tensioned flexible sound-responsive body, means comprising a curved surface stiffening member for rendering the central portion of the diaphragm substantially inflexible to insure the substantially uniform coincident movement of all parts of such portion in response to received vibrations, and to overcome the reduction in amplitude of vibration of the diaphragm, and a current-varying device supported by the inflexible portion.

9. In a vibration detector, a composite flexible diaphragm including a peripherally supported fabric element tensioned to closely approach its elastic limit and a soft rubber facing integrally united therewith, an inflexible member of reduced peripheral thickness centrally supported by and integrally united with the diaphragm to cause the substantially uniform coincident movement of all parts of the associated portion of the diaphragm without affecting the amplitude of vibration of the diaphragm and a current-varying device supported by the inflexible member.

10. In a vibration detector, a composite tensioned flexible diaphragm, means comprising a curved surface stiffening member for rendering the central portion of the diaphragm substantially inflexible, and for gradually varying in radial direction, the inertia of such portion to cause the inflexible portion to vibrate with an amplitude corresponding to that attained by the center of the diaphragm, and a current-varying device supported by such inflexible portion.

11. In a vibration detector, a tensioned flexible sound-responsive body, an inflexible sound responsive body carried thereby, and having a tapered surface for equalizing the amplitude of vibrations imparted to different portions thereof by the flexible member to insure uniform amplitude of vibrations of all portions thereof, and a current-varying device supported by the inflexible member.

12. In a vibration detector, a composite diaphragm including a member having one natural frequency of vibration integrally united with a member having another natural frequency, and a member possessing a composite natural frequency resulting from a plurality of different frequencies, and a current-varying device supported by the last-mentioned member.

13. In a vibration-detector, a diaphragm having a natural frequency of vibration within the useful range of frequencies, an inherently damping means uniformly and integrally united with the diaphragm for varying the response thereof at the natural frequency, and a current-varying device supported by the diaphragm.

14. In a vibration detector for use under varying pressures, a casing, a sound-responsive body mounted on said casing under tension approaching its elastic limit, and means for rendering the degree of tension of said sound responsive body substantially independent of variations in pressure.

15. In a vibration detector for use under varying pressures, a casing, a diaphragm body mounted thereon under tension approaching its elastic limit, means comprising a tapered surface stiffening member for rendering the central portion of said diaphragm substantially inflexible to insure the substantially uniform coincident movement of all parts of such portion in response to received vibrations, and to overcome the reduction in amplitude of vibration of the diaphragm, and a current-varying device supported by the inflexible portion.

16. In a vibration detector for use under varying pressures, a casing, a flexible sound-responsive body mounted thereon under tension approaching its elastic limit, an inflexible sound-responsive body comprising a tapered surface stiffening member carried by said flexible body, for equalizing the amplitude of vibrations imparted to different portions thereof by the flexible member to insure uniform amplitude of vibrations of all portions thereof, and a current-varying device supported by the inflexible member.

17. In a vibration detector for use under varying pressures, a casing, composite diaphragm mounted thereon under tension approaching its elastic limit and having a peripheral portion of soft waterproof material mounted thereon, a current-varying device supported by the diaphragm, and means cooperating therewith to imprison such peripheral portion, thereby rendering the junction waterproof.

18. In a vibration detector, a diaphragm having a natural frequency of vibration within the useful range of frequencies, an inherently damping means uniformly and integrally united with the diaphragm for varying the response thereof at the natural frequency, means cooperating therewith to overcome the reduction in amplitude of vibration of the diaphragm due to said damping means, and a current-varying device supported by the diaphragm.

In witness whereof, I hereunto subscribe my name this 16th day of June A. D., 1919.

CHARLES R. MOORE.